July 23, 1946.   C. E. WORKMAN   2,404,581
RESILIENT WHEEL
Filed Sept. 25, 1943
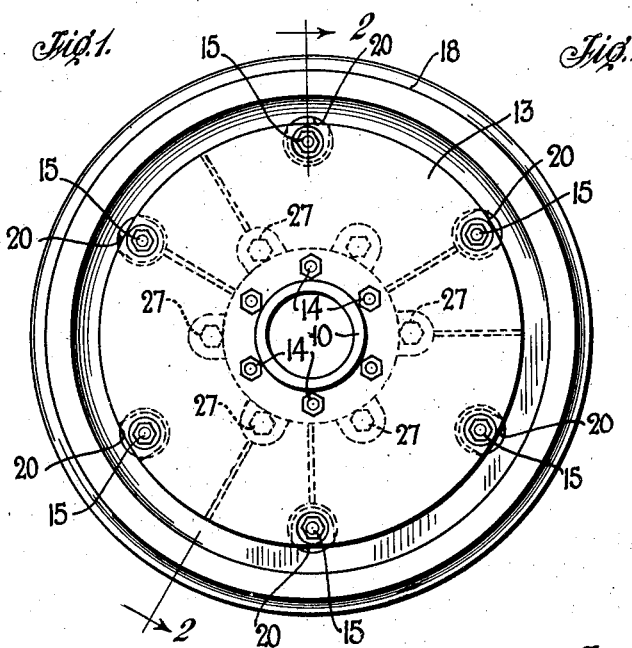
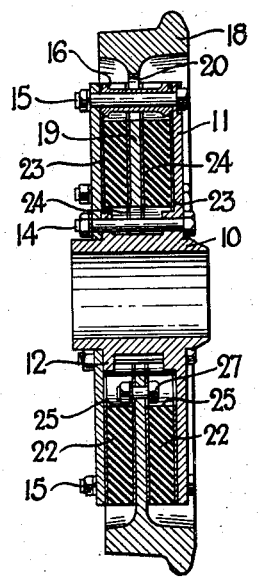
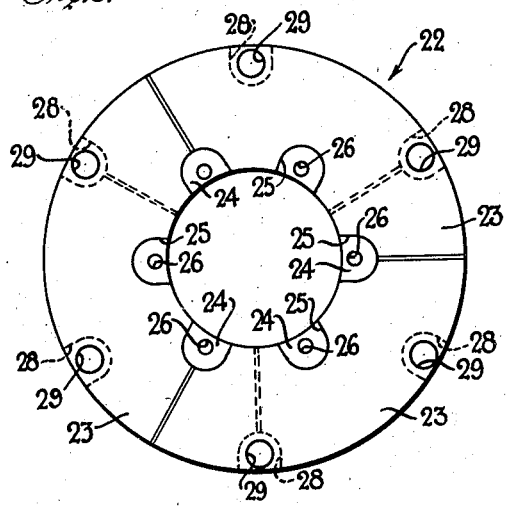
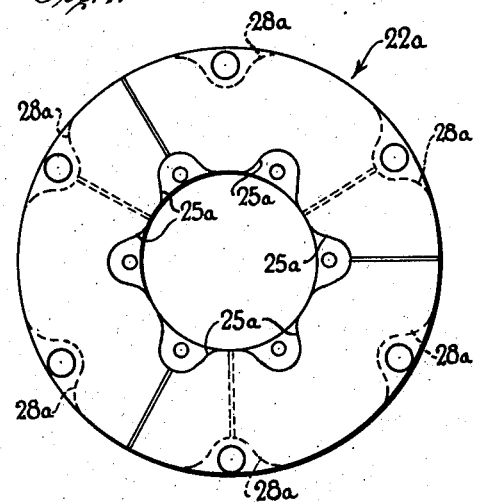
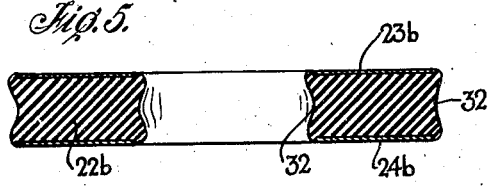
Inventor
CLARENCE E. WORKMAN Patented July 23, 1946

2,404,581

UNITED STATES PATENT OFFICE 2,404,581

RESILIENT WHEEL

Clarence E. Workman, Akron, Ohio, assignor to The Firestone Tire & Rubber Company, Akron, Ohio, a corporation of Ohio Application September 25, 1943, Serial No. 503,843

8 Claims. (Cl. 295—11)

This invention relates to resilient wheels for vehicles, and more especially it relates to resilient wheels for use on railway and similar vehicles.

Car wheels that run upon rails set up definite traction noises due to uneven road beds and to joints in the track rails. Furthermore the wheels are subject to objectionable jar and vibration, which may be transmitted to the body of the vehicle with resulting discomfort to passengers. Accordingly it has been proposed to employ car wheels having inherent resiliency capable of eliminating the transmission of noise therethrough, and which will contribute to riding comfort by suppressing jars and jolts to which it is subjected. It is to the improvement of this type of car wheel that this invention is directed.

The chief objects of the invention are to provide a resilient wheel of the character mentioned wherein the resilient elements thereof may be arranged so as to be subject solely to shear stress when loaded; to provide a wheel of the character mentioned wherein the resilient elements may or may not be normally under compressive stress, as desired; to provide simplicity and cheapness of construction; to provide facility of assembly; and in general to provide a superior resilient car wheel. Other objects will be manifest as the description proceeds.

Of the accompanying drawing:

Fig. 1 is a side elevation of a resilient wheel embodying the invention;

Fig. 2 is a section on the line 2—2 thereof;

Fig. 3 is a side elevation of one of the resilient elements of the improved wheel;

Fig. 4 is a side elevation of a somewhat modified resilient element; and

Fig. 5 is a diametric section through another modified resilient element for resilient wheels.

Referring to the drawing, there is shown in Figs. 1 and 2 a car wheel comprising a wheel hub 10 that may be of any suitable size, and which is of tubular form to receive the usual car axle or spindle upon which it is mounted during use in the usual manner. The hub 10 is formed near one end thereof with a relatively wide circumferential flange 11 that extends radially outwardly therefrom. The hub is formed near its opposite end with a relatively narrow or low circumferential flange 12 that extends radially outwardly therefrom, and mounted upon the hub in abutting relation to the outer lateral face of flange 12 is an annular cap plate 13 that is of the same outside diameter as the hub flange 11. The cap plate 13 is secured to the hub by a series of bolts 14, 14 that extend through the cap plate and hub flange 12, and through the other hub flange 11 which may be somewhat thicker at its juncture with the hub, as shown in Fig. 2, to give it greater strength. The cap plate also is secured to the flange 11, near the periphery of each, by a series of bolts 15, 15 that extend through said cap plate and flange, and a spacer member 16 is mounted on each bolt 15, between said cap plate and flange, to limit the extent that they can be drawn toward each other by said bolts.

At 18 is shown the metal tire or rim of the wheel, which tire is of the conventional configuration of tires adapted to travel on trackways. The tire 18 is formed with a radially inwardly extending circumferential flange 19, which flange is disposed substantially in the central plane of the tire. In the assembled wheel structure the tire 18 is disposed concentrically of the axis of wheel-hub 10, and the tire-flange 19 is disposed parallel to the cap plate 13 and hub-flange 11, midway between the same, the inner circumference of the tire flange 19 being disposed radially outwardly of the bolts 14. Adjacent the tire 18 the flange 19 is formed with a circumferential series of apertures 20 through which extend the bolts 15 with spacer members 16 thereon, the apertures 20 being substantially of larger diameter than said spacers to enable relative movement between the tire flange 19 and the cap plate 13 and hub-flange 11.

Positioned on opposite sides of the tire-flange 19, in the spaces between the latter and the cap-plate 13 and hub-flange 11, are identical annular resilient disc-like elements 22, 22 composed of rubber or rubber-like resilient material. Each of the resilient elements is enclosed at the respective lateral faces thereof by arcuate metallic plates that are bonded to the rubber structure, preferably by vulcanization. As is best shown in Fig. 3, there are three metal plates on each side of the resilient element, the plates on one side thereof being designated 23 and the plates on the other side being designated 24. The plates 23 and 24 have their arcuate margins disposed flush with the resilient structure 22 at the outer and inner circumferential faces thereof, and have their end margins disposed radially of the resilient structure. The end margins of the series of plates 23 are spaced apart slightly, as are the end margins of the series of plates 24. As is clearly shown in Fig. 3, the plates 23, 24 of a resilient element are not coincident with each other axially of the element, but are offset or staggered so that the location of the confronting ends of the plates 24 are offset angularly of the element from the location of the confronting ends of the plates 23. The arrangement obviates any local weakness of the structure due to the sectional character of the plates on the lateral faces thereof.

The plates 23, 24 are utilized for attaching the resilient elements 22 to the tire-flange 19, and to the cap-plate 13 or hub-flange 11 as the case may be. More specifically, the plates 23 are utilized for attaching one of the resilient elements to the cap-plate 13 and the other resilient element to the hub-flange 11, and the plates 24 are utilized for attaching both resilient elements to the tire-flange 19. Thus in the mounting of the resilient elements 22 in the wheel, their positions are reversed so that the plates 24 of each are in abutting relation to the tire-flange 19, the elements being concentric with the axis of the wheel. Each resilient element is formed at its inner circumference with a series of recesses or re-entrants 25 that are located in the plates 23 and resilient material of the elements, but not in the plates 24 thereof. The plates 24 are apertured at 26 in the regions thereof that are coincident with said re-entrants, said apertures receiving respective bolts 27, Fig. 2, that also extend through tire-flange 19 and secure the resilient elements 22 to the latter. Each resilient element 22 also is formed at its periphery with a series of recesses or re-entrants 28 that are located in the plates 24 and resilient material of the elements, but not in the plates 23 thereof. As is best shown in Fig. 3, the re-entrants 28 are six in number, as are the re-entrants 25, the re-entrants 25, 28 being offset from each other radially of the resilient element. The plates 23 are apertured at 29 in the regions thereof that are coincident with the re-entrants 28, said apertures receiving respective spaced members 16 that are mounted on bolts 15 between the cap-plate 13 and hub-flange 11, said spacers having shouldered end portions adapted to bear against the faces of the plates 23, around the apertures 29, as is clearly shown in Fig. 2. The re-entrants 28 provide clearance about the spacers 16 enabling the plates 24 to move with the tire-flange 19 relatively of the plates 23 when the wheel is in use.

From the foregoing it will be apparent that the vertical load carried by the wheel will subject the resilient members to shear stress only, and that the tire member 18 at all times will be resiliently supported out of metal-to-metal contact with the hub 10 and its flange 11 and cap-plate 13 so that no transmission of vibration or noise to a vehicle employing the wheel is possible. The use of the spacer members 16 and the presence of the hub-flange 12 limit the extent to which the cap-plate 13 may be drawn toward the hub-flange 11. Thus by controlling the thickness of the resilient elements 22 it is possible to control the extent to which said elements are subjected to lateral compressive stress, it also being possible to make the elements of such thickness that they will be subject to no compressive stress. The arrangement is such that the wearing qualities and resilient characteristics of the resilient elements may be retained for a longer period than would be the case if the compression of said elements was not controlled. Furthermore, the mounting of the resilient elements in the wheel is not dependent upon compression of the elements.

The feature of attaching the resilient elements to the hub structure adjacent the periphery of the elements and attaching the tire structure to the elements adjacent the inner circumference thereof assures a more even distribution of the stresses imposed upon said elements, and also enables the attaching bolts 27, that secure the elements to the tire structure, to be concealed and protected interiorly of the wheel. The feature of making the lateral facing plates 23, 24 of the resilient elements in section form instead of integral, as in prior constructions, gives the resilient elements a modicum of transverse flexibility and enables slight relative movement between the respective plates on either side of the elements so that less tolerence in the forming of the apertures 26, 29 is required, since the elements are capable of slight distortion to bring said apertures into registry with the bolt holes in members 11, 13 and 19 during the application of the bolts 15 and 27 in the assembling of the wheel.

The construction of the improved wheel is relatively simple and inexpensive, and achieves the other advantages set out in the foregoing statement of objects.

The modified resilient element 22a of the invention shown in Fig. 4 is essentially similar to the resilient elements 22 previously described, and differs therefrom solely in the form of the recesses or re-entrants in the inner circumference and periphery thereof. As shown in Fig. 4, said re-entrants are designated 25a and 28a and are in the shape of scallops that merge gently with the circumferential faces of the resilient element and its side plates, instead of defining sharp corners therewith as in the elements shown in Fig. 3. The arrangement effects a saving of material without sacrifice of any of the advantages of the invention.

The modified resilient element 22b shown in Fig. 5 is similar in most respects to the resilient elements previously described, and differs therefrom solely in the transverse contour of its inner and outer circumferential margins, between the lateral plates 23b, 24b of its structure. As shown in Fig. 5, the material of the resilient body 22b, when uncompressed, normally overlies the peripheral margins of the plates 23b, 24b and bulges somewhat beyond said margins, and is circumferentially grooved at 32, 32 between said bulged portions. The arrangement is such that when the resilient element 22b is placed under compressive stress, the radial displacement of the resilient material, toward both circumferences thereof, will flatten said grooves so that they approach transverse alignment with said bulges. The advantages of such arrangement are that the placing of the resilient elements under compressive stress does not impose deleterious tension in the marginal regions thereof such as would be caused by pressure-imposed bulging, and said marginal regions are not forced into a position where they can be cut by the margins of the lateral metal plates.

Other modifications may be resorted to without departing from the spirit of the invention, or the scope thereof as defined by the appended claims.

What is claimed is:

1. A resilient wheel comprising a tire structure formed with a radially inwardly extending flange, a hub structure concentric therewith having radially outwardly extending portions disposed on opposite sides of the tire flange in spaced relation thereto, respective resilient elements disposed between said flange and the hub portions at each side thereof, each of said resilient elements comprising a flat annular body of resilient material having a plurality of thin metallic plates bonded to each of the opposite lateral faces thereof, bolts anchoring the flange-contacting plates to said flange at the inner circumferential margin of each, and bolts anchoring the hub portions to the plates that contact the same adjacent the peripheral margin of said plates.

2. A resilient wheel comprising a tire structure formed with a radially inwardly extending flange, a hub structure concentric therewith formed at one side of its middle with a relatively wide radially outwardly extending flange disposed at one side of the tire flange in spaced relation thereto, and formed at the other side of its middle with a relatively low radially outwardly extending flange, a cap plate disposed on the other side of said tire flange in spaced relation thereto, bolts securing said cap plate to the outer lateral face of said relatively low flange whereby the cap plate is determinately positioned at its inner circumference, respective resilient elements disposed between the tire flange and hub flange and between the tire flange and cap plate, each of said resilient elements comprising a flat annular body of resilient material disposed concentrically of the hub and having a plurality of thin metallic plates bonded to each of the opposite lateral faces thereof, bolts anchoring the tire-flange-contacting plates to said flange at the inner circumferential margin of each, and bolts anchoring the other plates of the resilient elements to the hub flange and to the cap plate adjacent the peripheral margins thereof, which bolts extend through hub flange and cap plate and prevent spreading apart thereof.

3. Cushioning means for resiliently supporting a tire member on a hub, said means comprising a flat annular body of resilient material, and thin metallic facings bonded to opposite lateral surfaces thereof, each of said metallic facings being sectional.

4. Cushioning means for resiliently supporting a tire member on a hub, said means comprising a flat annular body of resilient material, and sectional metallic facings bonded to opposite lateral surfaces thereof, the facing sections on one side of the resilient body being offset with relation to the facing sections on the other side thereof.

5. Cushioning means for resiliently supporting a tire member on a hub, said means comprising a flat annular body of resilient material, and sectional metallic facings bonded to opposite lateral surfaces thereof, the margins of adjacent facing sections on either side of the body being slightly spaced apart from each other to enable at least a modicum of relative movement between sections.

6. Cushioning means for resiliently supporting a tire member on a hub, said means comprising a flat annular body of resilient material, and sectional metallic facings bonded to opposite lateral surfaces thereof, each facing section consisting of a flat arcuate plate with end margins disposed radially of the cushion, the end margins of adjacent sections on either side of the structure being in confronting relation to each other.

7. A combination as defined in claim 6 wherein the confronting margins of the plates on one side of the cushion are angularly offset from the confronting margins of the plates on the other side thereof.

8. Cushioning means for resiliently supporting a tire member on a hub, said means comprising a flat annular body of resilient material, and annular metallic facings bonded to opposite lateral surfaces thereof, the peripheral face of the resilient material normally bulging slightly beyond the inner and outer circumferential margins of the facings and overlying the same and being circumferentially recessed intermediate said bulges.

CLARENCE E. WORKMAN.